US011620855B2

(12) United States Patent
Kwatra et al.

(10) Patent No.: US 11,620,855 B2
(45) Date of Patent: Apr. 4, 2023

(54) ITERATIVE MEMORY MAPPING OPERATIONS IN SMART LENS/AUGMENTED GLASSES

(71) Applicant: INTERNATIONAL BUSINESS MACHINES CORPORATION, Armonk, NY (US)

(72) Inventors: Shikhar Kwatra, San Jose, CA (US); Jeremy R. Fox, Georgetown, TX (US); Sarbajit K. Rakshit, Kolkata (IN); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/948,110

(22) Filed: Sep. 3, 2020

(65) Prior Publication Data
US 2022/0068507 A1    Mar. 3, 2022

(51) Int. Cl.
*G16Y 20/10*  (2020.01)
*G06T 19/00*  (2011.01)
(Continued)

(52) U.S. Cl.
CPC ............... *G06V 40/18* (2022.01); *G06N 3/08* (2013.01); *G06T 19/006* (2013.01); *G16Y 20/10* (2020.01); *G16Y 20/40* (2020.01)

(58) Field of Classification Search
CPC .... G06K 9/00597; G06T 19/006; G06N 3/08; G16Y 20/10; G16Y 20/40
See application file for complete search history.

(56) References Cited

U.S. PATENT DOCUMENTS 10,129,510 B2    11/2018  Ma
2005/0221268 A1  10/2005  Chaar
(Continued)

FOREIGN PATENT DOCUMENTS

AU    2016201929 A1    10/2017
CN    105404943 A  *  3/2016
(Continued)

OTHER PUBLICATIONS

Disclosed Anonymously, "Selective lifelogging to record missed events of interest," Ip.com, Apr. 3, 2019, 7 pages, IP.com No. IPCOM000258053D.
(Continued)

*Primary Examiner* — Grace Q Li
(74) *Attorney, Agent, or Firm* — David Spalding (57) ABSTRACT

A method, computer system, and a computer program product for memory mapping is provided. The present invention may include identifying an augmented reality device and at least one Internet of Things (IoT) device which observes at least one biometric parameter. The present invention may include defining at least one user attention pattern based on the at least one biometric parameter. The present invention may include predicting an attentiveness of a user based on the at least one attention pattern. The present invention may
(Continued)

include recording data from the augmented reality device, based on the attentiveness of the user dropping below a certain point. The present invention may include storing the recorded data.

25 Claims, 5 Drawing Sheets

(51) Int. Cl.
*G06V 40/18* (2022.01)
*G16Y 20/40* (2020.01)
*G06N 3/08* (2006.01)

(56) References Cited

U.S. PATENT DOCUMENTS

| | | | |
|---|---|---|---|
| 2013/0257907 A1* | 10/2013 | Matsui | G09G 5/377 345/633 |
| 2014/0022402 A1 | 1/2014 | Mishra | |
| 2014/0067729 A1 | 3/2014 | Kozloski | |
| 2014/0098226 A1 | 4/2014 | Pletcher | |
| 2014/0133825 A1 | 5/2014 | Boss | |
| 2015/0326570 A1 | 11/2015 | Publicover | |
| 2016/0097940 A1 | 4/2016 | Sako | |
| 2017/0177075 A1 | 6/2017 | Zhang | |
| 2017/0339338 A1 | 11/2017 | Gordon | |
| 2018/0176243 A1* | 6/2018 | Arnaldo | G06N 3/0454 |
| 2018/0182161 A1 | 6/2018 | Chaudhari | |
| 2019/0188450 A1* | 6/2019 | Spivack | G06K 9/00201 |
| 2019/0332168 A1 | 10/2019 | Weldemariam | |
| 2019/0356957 A1 | 11/2019 | Kozloski | |
| 2019/0370750 A1 | 12/2019 | Punzalan | |
| 2020/0066264 A1 | 2/2020 | Kwatra | |
| 2020/0074647 A1* | 3/2020 | Moon | G06T 7/292 |
| 2020/0107072 A1* | 4/2020 | Lomada | H04N 21/8456 |
| 2021/0053586 A1* | 2/2021 | Domeyer | B60K 35/00 |

FOREIGN PATENT DOCUMENTS

| | | | |
|---|---|---|---|
| CN | 105814516 A | | 7/2016 |
| CN | 110175242 A | * | 8/2019 |
| CN | 111033442 A | | 4/2020 |
| WO | 2022049450 A1 | | 3/2022 |

OTHER PUBLICATIONS

Jaquith, "Sony's Smart Contact Lenses Can Record What You See These are tiny cameras that record and store whatever you see, and even play it back before your very eyes," www.futurism.com, May 2, 2016 [accessed on Jul. 27, 2020], 4 pages, Retrieved from the Internet: <URL: https://futurism.com/sonys-new-contact-lenses-let-record-store-everything-see>.

Kusnierek, "Sony's New Contact Lens Records Video With The Blink Of An Eye," www.youredm.com, Feb. 15, 2017 [accessed on Jul. 27, 2020], 5 pages, Retrieved from the Internet: <URL: https://www.youredm.com/2017/02/15/sonys-new-contact-lens-records-video-blink-eye/>.

Mell, et al., "The NIST Definition of Cloud Computing", National Institute of Standards and Technology, Special Publication 800-145, Sep. 2011, 7 pages.

Metz, "Google Stole Its Smart Contact Lens From Microsoft. And That's a Good Thing," www.wired.com, Jan. 17, 2014 [accessed on Jul. 27, 2020], 9 pages, Retrieved from the Internet: <URL: Google Stole Its Smart Contact Lens From Microsoft. And That's a Good Thing>.

Michallon, "Sony files to patent new contact lenses that can record video, store it, play it back—and adjust zoom, focus and aperture automatically," www.DailyMail.co.uk, Apr. 30, 2016 [accessed on Jul. 27, 2020], 34 pages, Retrieved from the Internet: <URL: https://www.dailymail.co.uk/sciencetech/article-3567402/Sony-patent-application-reveals-new-contact-lenses-record-video-store-play-adjust-zoom-focus-aperture-automatically.html>.

Sbwire, "Smart Contact Lenses Market Will Reach 3050 Million US$ by the End of 2025," Digital Journal, Jul. 19, 2018 [accessed on Jul. 27, 2020], 5 pages, Retrieved from the Internet: <URL: http://www.digitaljournal.com/or/3863401#ixzz5cKYpFoQS>.

Starr, "Sony patents contact lens that records what you see," CNET, May 2, 2016 [accessed on Jul. 27, 2020], 4 pages, Retrieved from the Internet: <URL: https://www.cnet.com/news/sony-patents-contact-lens-that-records-what-you-see/>.

International Searching Authority, "Written Opinion of the International Searching Authority," Patent Cooperation Treaty, dated Nov. 22, 2021, 10 pgs., International Application No. PCT/B2021/057737.

* cited by examiner

ITERATIVE MEMORY MAPPING OPERATIONS IN SMART LENS/AUGMENTED GLASSES

BACKGROUND

The present invention relates generally to the field of computing, and more particularly to vision-based technology.

Smart contact lenses may have the capability to capture video footage of a user's surroundings. For example, based on a specific eye event, a smart contact lens may begin to capture and store video footage. At the same time, the user may be distracted and/or generally inattentive (e.g., stressed, absent minded, among other things) towards the user's own surroundings. This may mean that even though a user has seen the surroundings, he or she may not recall a particular event (e.g., may not recall what he or she has seen and/or witnessed, including but not limited to during moments of acute focus such as introductions, moments when an anomalous event occurs, moments when he or she is interrupted, and/or moments when text is displayed in an online communication or on a media screen that is too lengthy to remember after reading).

SUMMARY

Embodiments of the present invention disclose a method, computer system, and a computer program product for memory mapping. The present invention may include identifying an augmented reality device and at least one Internet of Things (IoT) device which observes at least one biometric parameter. The present invention may include defining at least one user attention pattern based on the at least one biometric parameter. The present invention may include predicting an attentiveness of a user based on the at least one attention pattern. The present invention may include recording data from the augmented reality device, based on the attentiveness of the user dropping below a certain point. The present invention may include storing the recorded data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for memory mapping. As such, the present embodiment has the capacity to improve the technical field of augmented reality devices by recording and storing visual data gathered by an augmented reality device (e.g., a smart contact lens, a pair of smart glasses, or a head-mounted display) and continuously pruning the gathered data to determine information which may be deemed valuable to a user. More specifically, the present invention may include identifying an augmented reality device and at least one Internet of Things (IoT) device which observes at least one biometric parameter. The present invention may include defining at least one user attention pattern based on the at least one biometric parameter. The present invention may include predicting an attentiveness of a user based on the at least one attention pattern. The present invention may include recording data from the augmented reality device, based on the attentiveness of the user dropping below a certain point. The present invention may include storing the recorded data.

As described previously, smart contact lenses may have the capability to capture video footage of a user's surroundings. For example, based on a specific eye event (e.g., looking up, looking down, looking left, looking right, rolling eyes, blinking in a particular sequence, closing eyes, opening eyes wide, among other eye events), a smart contact lens may begin to capture and store video footage. At the same time, the user may be distracted and/or generally inattentive (e.g., stressed, absent minded, among other things) towards the user's own surroundings. This may mean that even though a user has seen the surroundings, he or she may not recall a particular event (e.g., may not recall what he or she has seen and/or witnessed, including but not limited to during moments of acute focus such as introductions, moments when an anomalous event occurs, moments when he or she is interrupted, and/or moments when text is displayed in an online communication or on a media screen that is too lengthy to remember after reading).

Therefore, it may be advantageous to, among other things, address such memory constrained scenarios by providing a means by which a user's short term memory abilities and/or patterns of forgetfulness may be detected, and accordingly, a smart contact lens and/or augmented glasses may automatically capture video depicting the user's surroundings.

According to at least one embodiment, a smart storage management mechanism may be embedded in a smart lens (i.e., a smart contact lens), a pair of smart glasses (i.e., augmented glasses, augmented reality glasses), a head-mounted display, and/or another augmented reality gadget. The smart storage management mechanism may employ configurable learning tools to teach a level of selectively and dynamically storing, labeling, and/or indexing oral, textual, and/or visual data, including any attributes associated with the user's captured footage, which may be used for future referencing.

According to at least one embodiment, the smart storage management mechanism may include continuous pruning of selective features using iterative training, which may take into consideration a user's preferences (e.g., those configured in the program), as well as a user's learned behavior, to determine the level of information which may be considered valuable to the user, and which may be desired for later use and/or reference.

According to at least one embodiment, the smart storage management mechanism may trigger the recording capabilities of the device for a single user as well as a grouping of users and may use machine learning to learn when to trigger the device for recording.

According to at least one embodiment, the smart storage management mechanism may assist in retaining temporal events, including but not limited to events based on geographic proximity and a user's forgetfulness of location, a time of day (e.g., when a user is overly tired), and/or in scenarios where there are numerous activities which warrant a user's attention.

Figure 1:
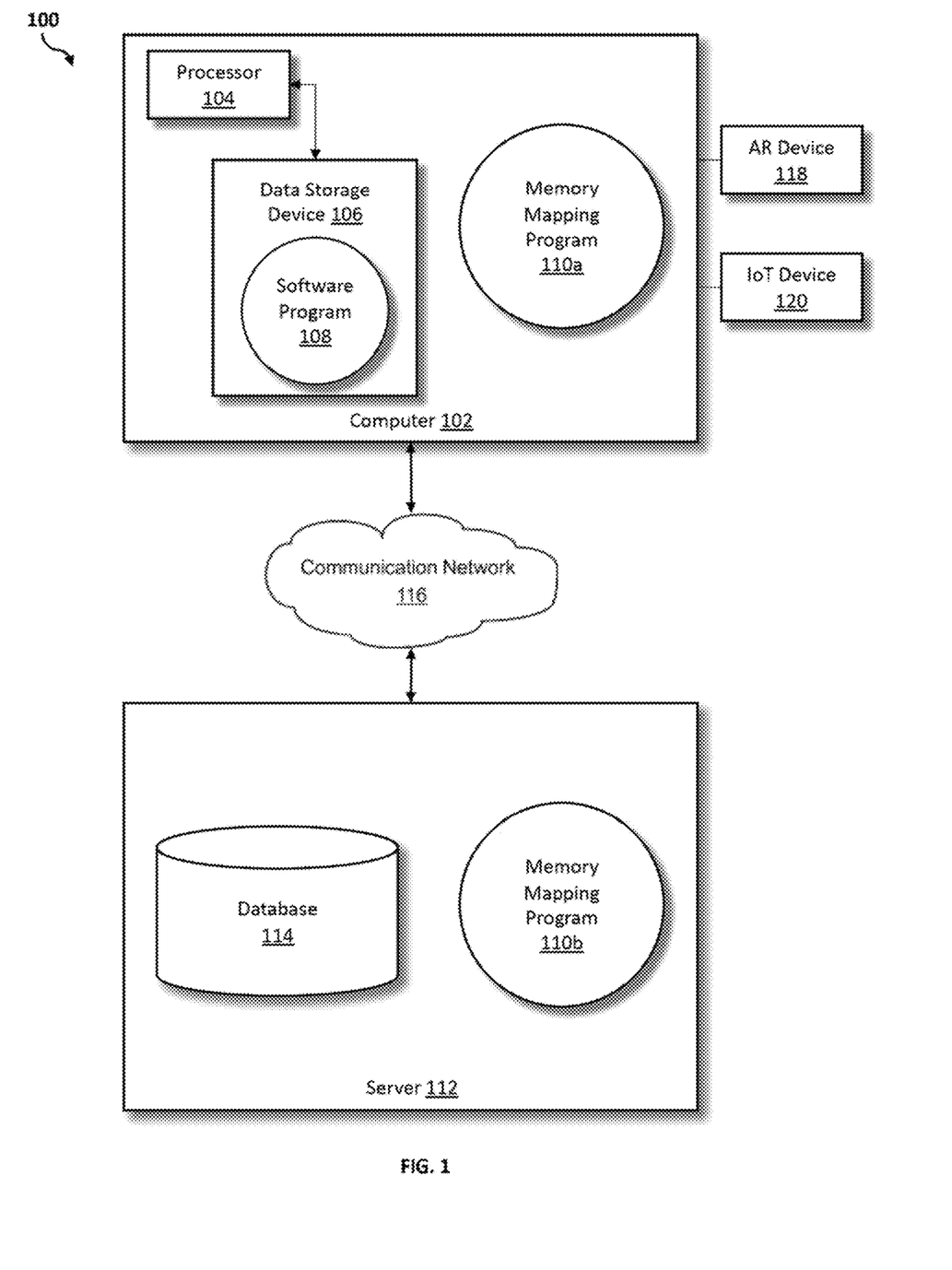
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a memory mapping program 110a. The networked computer environment 100 may also include a server 112 that is enabled to run a memory mapping program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. The augmented reality (AR) device 118 and the Internet of Things (IoT) device 120 are depicted as shown as their own separate entities but may be integrated into another part of the computer network environment. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the memory mapping program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the memory mapping program 110a, 110b (respectively) to record and store visual data gathered by an augmented reality device (e.g., a smart contact lens, a pair of smart glasses, or a head-mounted display) and continuously pruning the gathered data to determine information which may be deemed valuable to a user. The memory mapping method is explained in more detail below with respect to FIG. 2.

Figure 2:
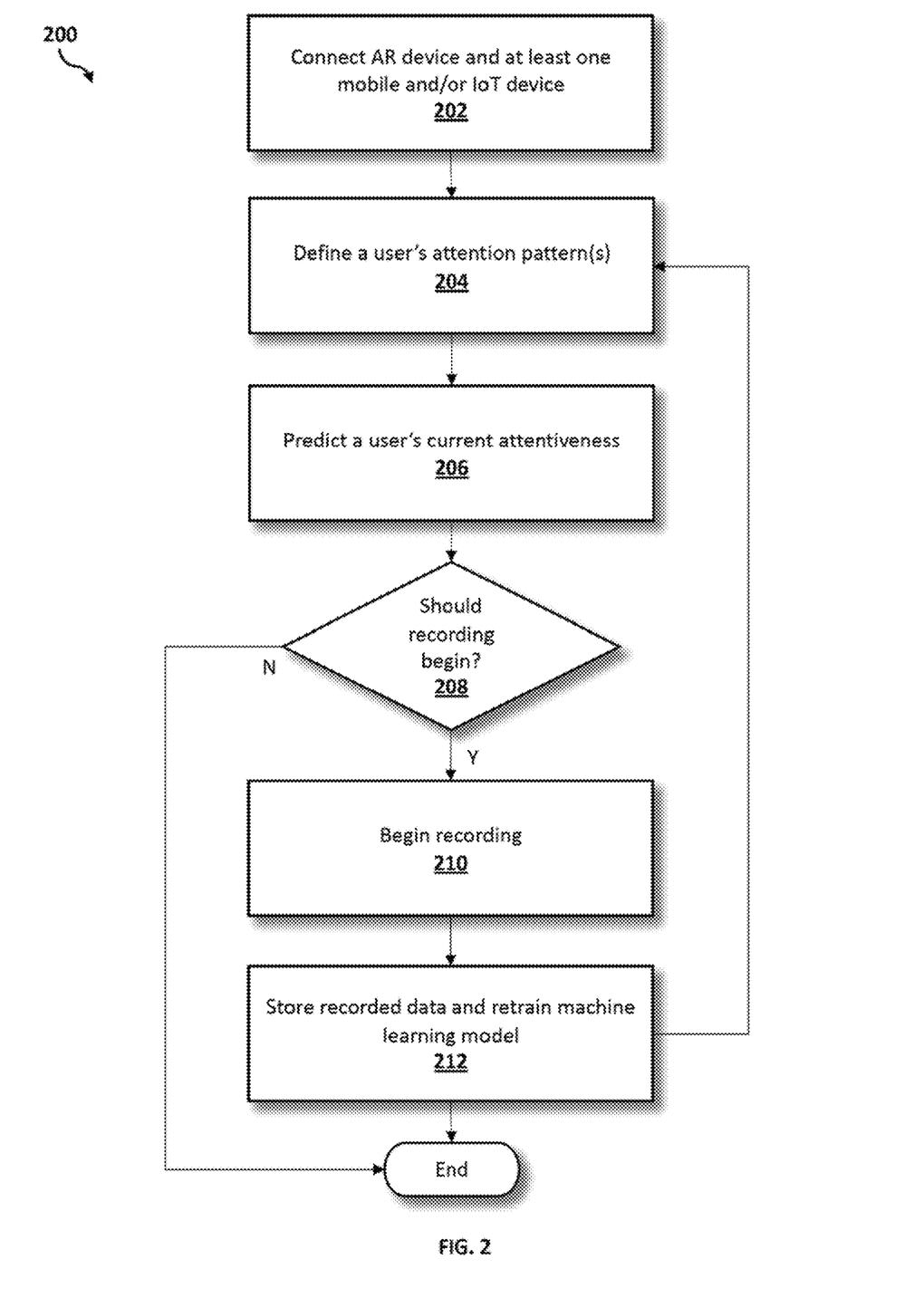
FIG. 2 is an operational flowchart illustrating a process for memory mapping according to at least one embodiment.

Referring now to FIG. 2, an operational flowchart illustrating the exemplary memory mapping process 200 used by the memory mapping program 110a and 110b according to at least one embodiment is depicted.

At 202, an augmented reality (AR) device is connected to at least one mobile and/or Internet of Things (IoT) device. A smart contact lens, a pair of smart glasses, and/or another augmented reality (AR) device which includes an embedded video camera may be connected to at least one mobile and/or Internet of Things (IoT) device using a communication network (e.g., communication network 116) so that a user's predicted level of attentiveness and ability to recall the user's surroundings at a later date may be determined and a recording may be made.

The IoT may be a system of interrelated computing devices, mechanical and digital machines with embedded sensors which may transmit data over the Internet, without requiring human-to-human or human-to-computer interaction. Connected IoT devices may be embedded into mobile devices, industrial equipment, and/or environmental sensors, among many other things, including, but not limited to, watches, cars, thermostats, voice assistants, etc.

The AR device may be connected to the IoT device by Bluetooth® (Bluetooth and all Bluetooth-based trademarks and logos are trademarks or registered trademarks of Bluetooth SIG, Inc. and/or its affiliates), WiFi, radio, and/or other method of communication which may enable data to be transmitted (e.g., a signal, a stream of video) between the AR device and the IoT device.

At 204, a user's attention patterns are defined. A knowledge corpus (e.g., a cloud database and/or database 114) may be created to store user attention pattern(s) (e.g., identified correlations between a user's biometric parameter(s), attentiveness towards the user's surroundings, and an ability to recall a particular scenario).

The memory mapping program 110a, 110b may deploy a long short-term memory (LSTM) recurrent neural network (RNN) which may be used to predict an attention pattern of the user via autoencoders. A LSTM-RNN model may take into account multi-variate time series data (e.g., a series of data points indexed in time order which may have been taken at successive, equally spaced intervals or points in time). The time series data may be time series data about a user and the activities, if any, performed by the user. The time series data may be gathered form a connected augmented reality (AR) device (e.g., a smart contact lens, a pair of smart glasses, a head-mounted display, and/or another augmented reality gadget).

For example, time series data may include a user gazing in a particular direction and/or walking or driving in a particular direction. The time series data may include categorical feature variables (e.g., gazing or walking, among many other things). These categorical feature variables may be converted into numerical feature vectors by encoding (e.g., using label encoding or one-hot encoding in which categorical feature variables may be converted into a numerical form usable by the machine learning algorithm, among other encoding methods). The numerical feature vectors may be fed into the LSTM-RNN architecture.

The numerical feature vectors may enable the LSTM-RNN model to learn a probable activity of a user, if any, and to perform attention detection together with an autoencoder (e.g., an encoder-decoder architecture for recurrent neural networks may be used for sequence-to-sequence prediction problems). Attention detection may be a mechanism and/or a layer in a deep learning model that addresses a limitation of the encoder-decoder architecture on long sequences of data and may use the skill of the LSTM-RNN model on sequence-to-sequence prediction problems.

An autoencoder may be an unsupervised learning technique which may take as input an image (e.g., from a connected camera and/or video feed, including those connected to an augmented reality device), compress the image into a latent-space representation, and reconstruct an output image from the latent-space representation. The autoencoder may be comprised of a bottleneck which may contain an input representation of the data (e.g., data x may have an input representation of f(x))). A decoder in the autoencoder may then produce a reconstruction of the input data using the encoding in the bottleneck (e.g., a reconstruction of input data x is r=g(f(x))). The autoencoder may learn about any regularity in the input data (e.g., video data).

Historical parameters may be gathered by various devices of the user (e.g., augmented reality devices and/or IoT devices), and may be taken into account here to predict the attention pattern of the user. Historical parameters may include data gathered about a user's attentiveness level, and a user's ability to recall a scenario, including whether the user's recollection is made while the user is in a poor cognitive state (e.g., sad, stressed, and/or health problems, among other things). Historical parameters may be gathered by the connected IoT device(s), as described previously with respect to step 202 above, and may be stored in the knowledge corpus (e.g., cloud database and/or database 114).

A principal component analysis (PCA) may also be used with the LSTM-RNN model to determine a context of the user's surroundings based on real-time biometric parameter(s) (e.g., captured via a connected IoT wearable device), a rate of change in a biometric parameter of the user, a contextual need of the user's surrounding, any written text (e.g., a phone number, a license plate number, information written on a business card, business hours of operation, an address and/or a street name), and/or an introduction when someone states his/her name, among other instances which may be captured by an AR device. A PCA may be a dimensionality-reduction method used to reduce the dimensionality of a dataset by constructing principal components. A PCA plot may depict clusters together based on similarity.

When the number of parameters is very complex and the LSTM-RNN model is ingesting a multitude of inputs, a PCA may be used to understand the relationship between the input variables and/or to perform dimensionality reduction (e.g., to reduce the number of input features or feature vectors to be used with the algorithm).

At 206, a user's current attentiveness is predicted. The LSTM-RNN model with PCA (as described previously with respect to step 204 above), used for feature analysis and pruning, may be considered when predicting at what cognitive state the user may overlook or may not be able to recall certain details pertaining to the user's surroundings.

A user's cognitive heuristics (e.g., a user's method for processing information, including considering issues ratio- nally, logically, deliberately, verbally, effortlessly, emotionally, and/or intuitively, among other things) may be used to identify a user's "norm," and anomalies in user's behavior, a "delta," (e.g., based on the use of certain words, loud sounds, and/or drastic accelerometer changes) may be used to identify a user's attentiveness at a given time.

According to at least one embodiment, a user's attentiveness may be measured on a relative scale (e.g., with a lower measured attentiveness having an attentiveness score closer to 0 and a higher measured attentiveness score closer to 100). An augmented reality (AR) device of the user may begin to record when a user's attentiveness drops below a predefined threshold and/or deviates from the user's behavior by a delta (e.g., drops below a certain point, such as a calculated 50%, on the relative scale).

For example, a baseline profile of a user may be created (e.g., using the learning mechanism described previously with respect to step 204 above) and a deviation from the user's baseline profile may be identified, with the memory mapping program 110*a*, 110*b* further identifying the user as being attentive or inattentive.

A specific eye event (e.g., looking up, looking down, looking left, looking right, rolling eyes, blinking in a particular sequence, closing eyes, opening eyes wide, among other eye events), may also trigger a smart contact lens to begin to capture and store video footage. By projecting information directly onto a user's retina, the augmented reality (AR) device (e.g., a user's smart contact lens, pair of smart glasses, and/or other augmented reality (AR) device) may be able to capture gesture-based eye movements to initiate the capturing and storing of video footage.

Feature pruning (e.g., iterative event pruning used to reduce the complexity in a machine learning algorithm) may also be utilized when the user attempts to recall a certain situation and/or event from a plethora of past events (e.g., $E_1, E_2, \ldots, E_n$). The user may experience difficulty recalling the event (e.g., $E_m$) but may able to recall other events. A PCA analysis and other feature frame pruning mechanisms may be used to establish a user's context, including by developing the user's pruning strategy (e.g., identifying instances where a user experiences difficulty recalling past events). Iterative event pruning may help to establish a user's baseline profile and to identify a user's deviation from the baseline profile by saving data (e.g., photo and/or video data, among other things) captured by the user's smart contact lens, pair of smart glasses, and/or other augmented reality (AR) device, which may relate to events not previously recalled by the user.

At 208, the memory mapping program 110*a*, 110*b* determines whether recording on the augmented reality (AR) device should begin. For example, based on a specific eye event (e.g., looking up, looking down, looking left, looking right, rolling eyes, blinking in a particular sequence, closing eyes, opening eyes wide, among other eye events), and/or a user's biometric parameter, a smart contact lens may begin to capture and store video footage.

A memory model may be juxtaposed with an assist processor and/or a graphics processing unit (GPU) running a PCA analysis (as described previously with respect to steps 204 and 206 above) on the user's varying heuristics.

For example, a user may be found to be distracted and inattentive, and based on historical data (e.g., including a user's attentiveness level in previous similar circumstances), the memory mapping program 110*a*, 110*b* may determine that the user will not recall details of what the user has seen, and that recording on the augmented reality (AR) device should begin. Upon this determination, various devices of the user, including any connected augmented reality (AR) devices and/or IoT devices, may continue to track the user's attentiveness level and may also capture the user's surrounding(s).

Furthermore, according to at least one embodiment of the present invention, if a computing ecosystem of the user (e.g., a combination of the user's mobile device(s), wearable device(s), feed from smart contact lenses, and/or IoT sensor(s), among other things), connected to the memory mapping program 110a, 110b, identifies that the user is not attentive, or may not recall the event based on the event's similarity to past events which the user did not recall, and at the same time the user's focus direction is distracted from a target surrounding, then the memory mapping program 110a, 110b may interact with at least one other user's (i.e., a nearby user's) paired smart contact lens and/or augmented reality device (e.g., augmented glasses, augmented reality glasses, etc.) to capture the surrounding environment of the user.

The memory mapping program 110a, 110b may be capable of instantly identifying and connecting to an augmented reality device of a nearby user (e.g., a nearby user who also uses a version of the memory mapping program 110a, 110b). Any data captured by an augmented reality device of the nearby user may be saved in a database connected to the memory mapping program 110a, 110b of the user.

For example, two friends are traveling together. If one friend is upset and not very attentive (e.g., not focusing on the famed sites in the area), then the memory mapping program 110a, 110b will identify this and will engage the sensor(s) of the other friend's smart contact lens and/or augmented reality device to capture the surroundings on behalf of the other friend.

If it is determined here that a recording should begin, then the memory mapping program 110a, 110b proceeds to step 210 below.

If it is determined here that a recording should not begin, then the memory mapping program 110a, 110b ends.

At 210, the recording begins. A content recording event may be initiated at time T. At that time, a smart contact lens and/or other augmented reality device (e.g., augmented glasses, augmented reality glasses, head-mounted display, among other things) may automatically record video of the user's surroundings, based on a determination at step 208 above that recording on the augmented reality (AR) device should begin.

For example, in instances where a user is overly excited or scared, among other emotions which may consume the user's reactions and/or thoughts, video may be automatically captured by the memory mapping program 110a, 110b on a smart contact lens and/or other augmented reality (AR) device(s). The user's emotions may be determined by the memory mapping program 110a, 110b based on the connected IoT devices, including, but not limited to wearable devices which may capture the user's biometric data (i.e., a biometric parameter), among other things.

At 212, the recorded data is stored and the machine learning model is retrained. A training period may be engaged by the memory mapping program 110a, 110b and all data gathered during a time series event (e.g., Time T for series of Events E ($E_1$, $E_2$, . . . , $E_n$)) may be recorded and stored in a cloud database (e.g., database 114).

A retraining of the machine learning model may be as described previously with respect to step 204 above.

It may be appreciated that FIG. 2 provide only an illustration of one embodiment and do not imply any limitations with regard to how different embodiments may be implemented. Many modifications to the depicted embodiment(s) may be made based on design and implementation requirements.

Figure 3:
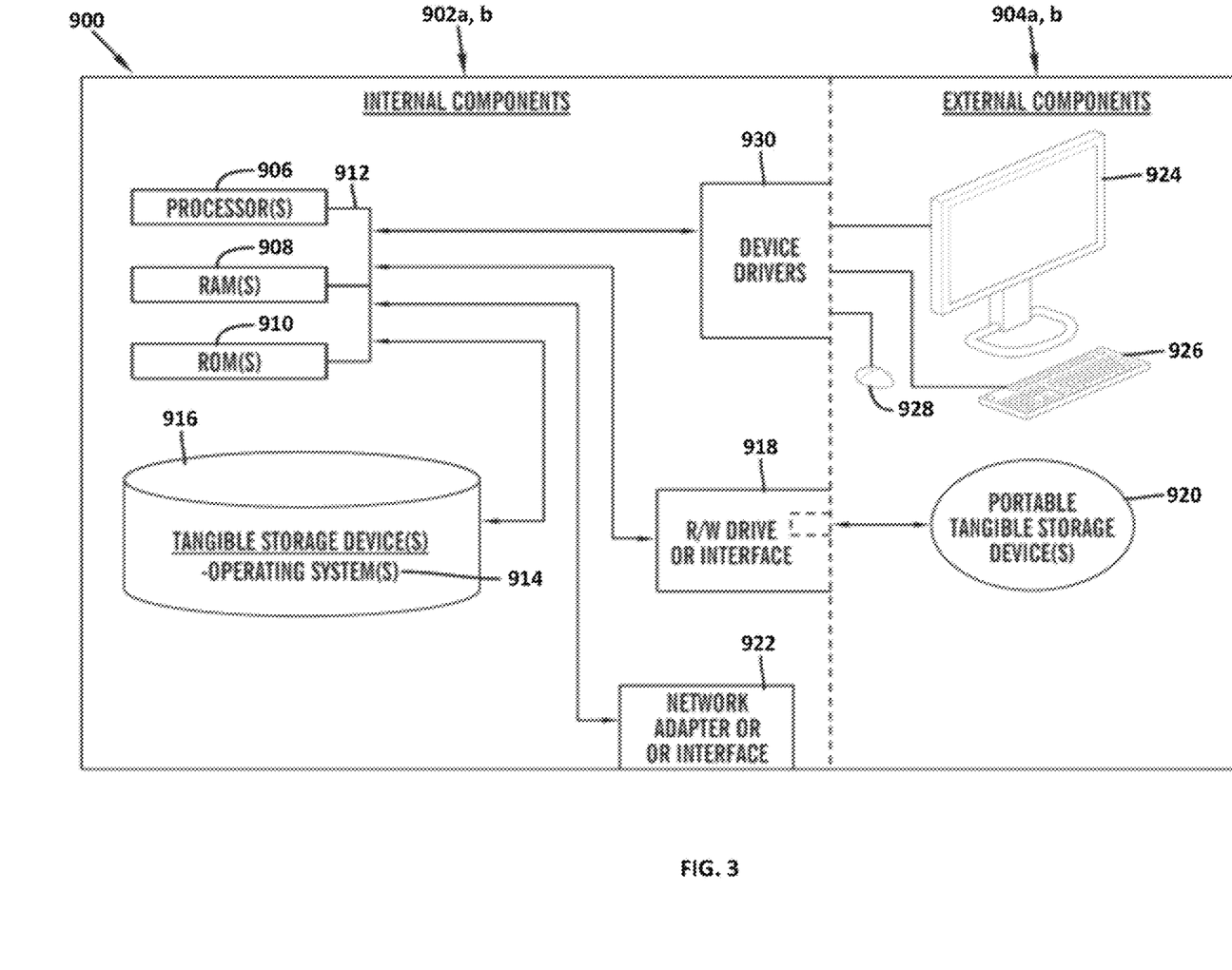
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the memory mapping program 110a in client computer 102, and the memory mapping program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the memory mapping program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the memory mapping program 110a in client computer 102 and the memory mapping program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the memory mapping program 110a in client computer 102 and the memory mapping program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
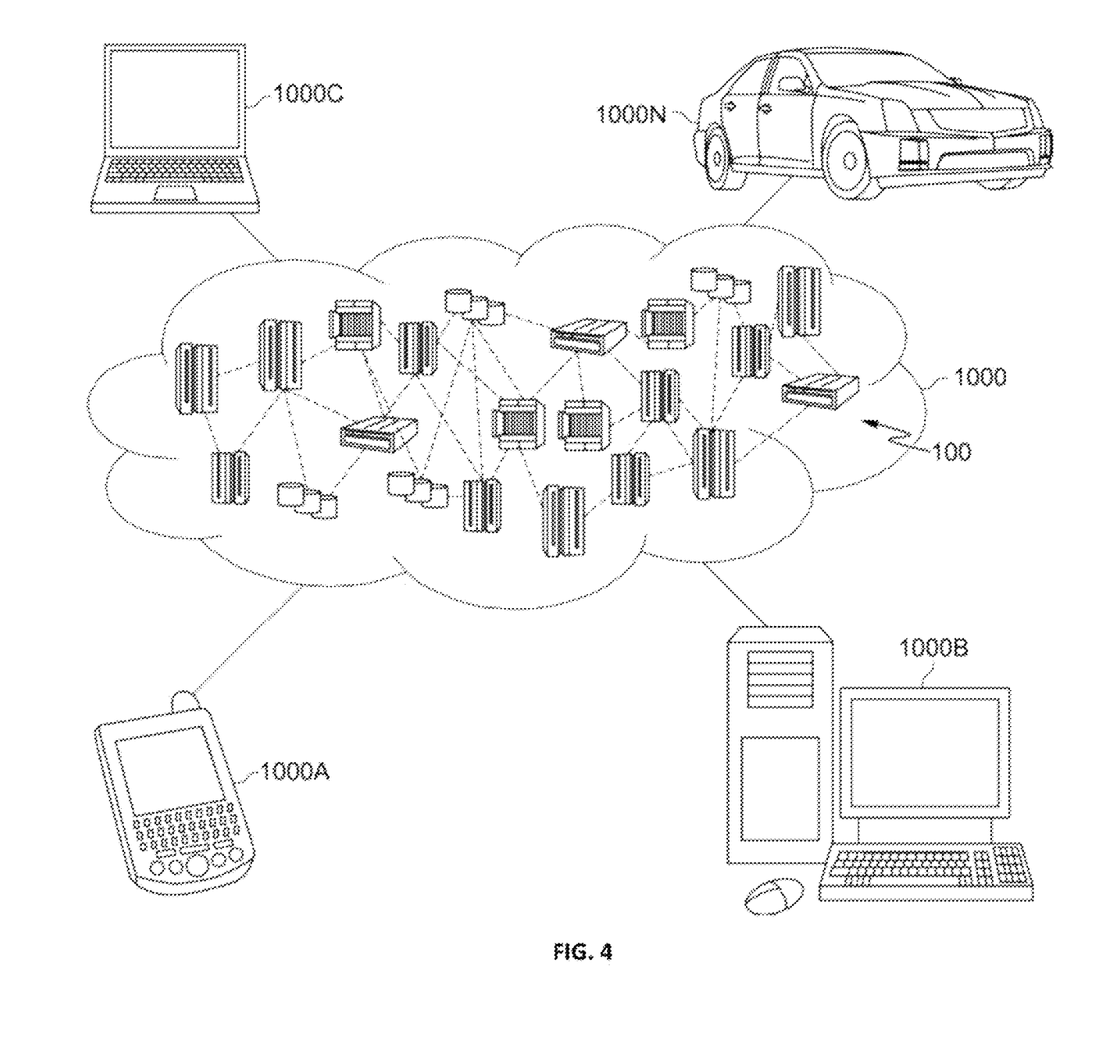
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
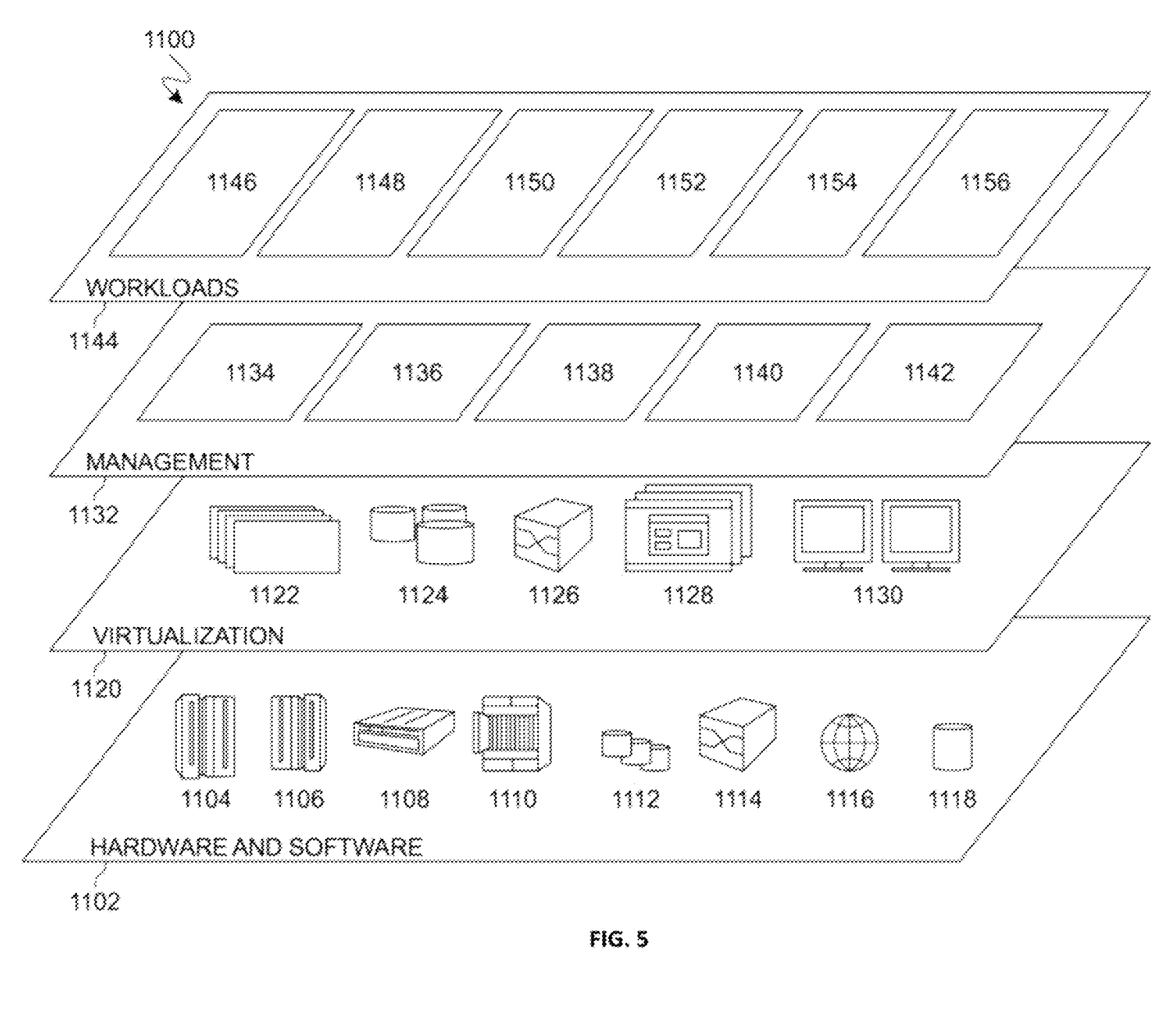
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and memory mapping 1156. A memory mapping program 110a, 110b provides a way to record and store visual data gathered by an augmented reality device (e.g., a smart contact lens, a pair of smart glasses) and continuously pruning the gathered data to determine information which may be deemed valuable to a user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for memory mapping, the method comprising:
    identifying an augmented reality device and at least one Internet of Things (IoT) device which observes at least one biometric parameter;
    defining at least one user attention pattern based on the at least one biometric parameter;
    predicting an attentiveness of a user based on the at least one user attention pattern;
    recording data from the augmented reality device, based on the attentiveness of the user dropping below a certain point, wherein a baseline profile of the user is established, in part, based on iterative event pruning and a determination of a user's memory pruning strategy;
    storing the recorded data; and
    retraining a long short-term memory (LSTM) recurrent neural network (RNN) model using multi-variate time series data points of the recorded data, wherein the long short-term memory (LSTM) recurrent neural network (RNN) model updates the user's memory pruning strategy.

2. The method of claim 1, wherein the augmented reality device is selected from the group consisting of: a smart contact lens, a pair of smart glasses, and a head-mounted display.

3. The method of claim 1, wherein the predicting the attentiveness of the user based on the at least one user attention pattern further comprises: deploying the long short-term memory (LSTM) recurrent neural network (RNN) model to predict the at least one user attention pattern via autoencoders.

4. The method of claim 3, further comprising: using a principal component analysis (PCA) with the long short-term memory (LSTM) recurrent neural network (RNN) model to determine a context of a user's surroundings based on the at least one biometric parameter.

5. The method of claim 1, wherein the predicting the attentiveness of the user based on the at least one user attention pattern further comprises:
    determining that the user is inattentive; and
    engaging a nearby user's augmented reality device.

6. The method of claim 1, wherein the recording the data from the augmented reality device, based on the attentiveness of the user dropping below the certain point, further comprises: calculating a deviation in the attentiveness of the user from the baseline profile of the user.

7. The method of claim 1, wherein the storing the recorded data further comprises: storing the recorded data in a connected database.

8. A computer system for memory mapping, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying an augmented reality device and at least one Internet of Things (IoT) device which observes at least one biometric parameter;
defining at least one user attention pattern based on the at least one biometric parameter;
predicting an attentiveness of a user based on the at least one attention pattern;
recording data from the augmented reality device, based on the attentiveness of the user dropping below a certain point, wherein a baseline profile of the user is established, in part, based on iterative event pruning and a determination of a user's memory pruning strategy;
storing the recorded data; and
retraining a long short-term memory (LSTM) recurrent neural network (RNN) model using multi-variate time series data points of the recorded data, wherein the long short-term memory (LSTM) recurrent neural network (RNN) model updates the user's memory pruning strategy.

9. The computer system of claim 8, wherein the augmented reality device is selected from the group consisting of: a smart contact lens, a pair of smart glasses, and a head-mounted display.

10. The computer system of claim 8, wherein the predicting the attentiveness of the user based on the at least one user attention pattern further comprises: deploying the long short-term memory (LSTM) recurrent neural network (RNN) model to predict the at least one user attention pattern via autoencoders.

11. The computer system of claim 10, further comprising: using a principal component analysis (PCA) with the long short-term memory (LSTM) recurrent neural network (RNN) model to determine a context of a user's surroundings based on the at least one biometric parameter.

12. The computer system of claim 8, wherein the predicting the attentiveness of the user based on the at least one user attention pattern further comprises:
determining that the user is inattentive; and
engaging a nearby user's augmented reality device.

13. The computer system of claim 8, wherein the recording the data from the augmented reality device, based on the attentiveness of the user dropping below the certain point, further comprises: calculating a deviation in the attentiveness of the user from the baseline profile of the user.

14. The computer system of claim 8, wherein the storing the recorded data further comprises: storing the recorded data in a connected database.

15. A computer program product for memory mapping, comprising:
one or more non-transitory computer-readable storage media and program instructions stored on at least one of the one or more non-transitory computer-readable storage media, the program instructions executable by a processor to cause the processor to perform a method comprising:
identifying an augmented reality device and at least one Internet of Things (IoT) device which observes at least one biometric parameter;
defining at least one user attention pattern based on the at least one biometric parameter;
predicting an attentiveness of a user based on the at least one attention pattern;
recording data from the augmented reality device, based on the attentiveness of the user dropping below a certain point, wherein a baseline profile of the user is established, in part, based on iterative event pruning and a determination of a user's memory pruning strategy;
storing the recorded data; and
retraining a long short-term memory (LSTM) recurrent neural network (RNN) model using multi-variate time series data points of the recorded data, wherein the long short-term memory (LSTM) recurrent neural network (RNN) model updates the user's memory pruning strategy.

16. The computer program product of claim 15, wherein the augmented reality device is selected from the group consisting of: a smart contact lens, a pair of smart glasses, and a head-mounted display.

17. The computer program product of claim 15, wherein the predicting the attentiveness of the user based on the at least one user attention pattern further comprises: deploying the long short-term memory (LSTM) recurrent neural network (RNN) model to predict the at least one user attention pattern via autoencoders.

18. The computer program product of claim 17, further comprising: using a principal component analysis (PCA) with the long short-term memory (LSTM) recurrent neural network (RNN) model to determine a context of a user's surroundings based on the at least one biometric parameter.

19. The computer program product of claim 15, wherein the predicting the attentiveness of the user based on the at least one user attention pattern further comprises:
determining that the user is inattentive; and
engaging a nearby user's augmented reality device.

20. The computer program product of claim 15, wherein the recording the data from the augmented reality device, based on the attentiveness of the user dropping below the certain point, further comprises: calculating a deviation in the attentiveness of the user from the baseline profile of the user.

21. A method for memory mapping, the method comprising:
predicting an inattentiveness of a user by using a baseline user profile, established based on iterative event pruning and a determination of a user's memory pruning strategy;
identifying a nearby user;
recording data observed by an augmented reality device of the nearby user based on the predicted inattentiveness of the user;
storing the recorded data; and
retraining a long short-term memory (LSTM) recurrent neural network (RNN) model using multi-variate time series data points of the recorded data, wherein the long short-term memory (LSTM) recurrent neural network (RNN) model updates the user's memory pruning strategy.

22. The method of claim 21, wherein the predicting the inattentiveness of the user further comprises: deploying the long short-term memory (LSTM) recurrent neural network (RNN) model to predict a user attention pattern via autoencoders, wherein a principal component analysis (PCA) is used with the long short-term memory (LSTM) recurrent neural network (RNN) model to determine a context of a user's surroundings based on at least one biometric parameter.

23. A method for triggering a recording by an augmented reality device, the method comprising:
identifying the augmented reality device and at least one Internet of Things (IoT) device which observes an eye event, wherein the eye event is selected from a group consisting of: looking up, looking down, looking left, looking right, rolling eyes, blinking the eyes in a particular sequence, closing the eyes, and opening the eyes wide;

defining at least one user attention pattern based on the eye event;

predicting an attentiveness of a user based on the at least one user attention pattern;

determining, by a machine learning algorithm, that the augmented reality device should begin to record when the attentiveness of the user drops below a certain point; and recording data from the augmented reality device, wherein a baseline profile of the user is established based, in part, on iterative event pruning and a determination of a user's memory pruning strategy.

24. The method of claim 23, wherein the augmented reality device is a smart contact lens.

25. The method of claim 23, wherein the machine learning algorithm is a long short-term memory (LSTM) recurrent neural network (RNN) model with a principal component analysis (PCA).

\* \* \* \* \*